Jan. 31, 1956

T. D. MORGAN 2,732,834

AUTOMATIC TRANSMISSION FOR INTERNAL COMBUSTION ENGINES

Filed Aug. 27, 1951

INVENTOR.
T. D. MORGAN

BY
Hudson & Young
ATTORNEYS

Jan. 31, 1956　　　　T. D. MORGAN　　　　2,732,834
AUTOMATIC TRANSMISSION FOR INTERNAL COMBUSTION ENGINES
Filed Aug. 27, 1951　　　　　　　　　　　　　2 Sheets-Sheet 2

INVENTOR.
T. D. MORGAN
BY
*Hudson + Young*
ATTORNEYS

United States Patent Office 2,732,834
Patented Jan. 31, 1956

2,732,834

AUTOMATIC TRANSMISSION FOR INTERNAL COMBUSTION ENGINES

Thomas D. Morgan, Oak Ridge, Tenn., assignor to Phillips Petroleum Company, a corporation of Delaware Application August 27, 1951, Serial No. 243,840

20 Claims. (Cl. 123—118)

This invention relates to an automatic device for transferring power from an internal combustion engine to a load, such as the wheels of a vehicle. In another aspect, it relates to an improved distributor for such vehicles.

The problem of transferring power from an internal combustion engine to a load is one which has been investigated for a long period of time. In the development of such devices, usually referred to as transmissions, the earlier improvements were directed to gear systems interposed between the engine and load, such as the wheels of a vehicle, and many ingenious devices were developed to provide various gear ratios, to suppress noise resulting from clashing of gears, and to reduce the size and weight of the gear units without decreasing their efficiency.

In this country, for many years, considerations of size and weight limited the usual gear transmissions to three forward speeds and one reverse speed for passenger automobiles. Heavier vehicles, such as buses and trucks, must be provided with more forward speeds, which involves heavier and more complicated transmissions with increased work on the part of the operator in shifting through several forward speed ranges.

The increasing speeds attainable by passenger vehicles has resulted in the development of transmissions having four forward speeds, on the one hand, and of transmissions wherein the engine is hydraulically coupled to the drive shaft, on the other hand. The latter system requires a considerable number of parts as the hydraulic system, while efficient at low speeds, rapidly becomes inefficient at greater rates of speed. Therefore, in such transmissions, the hydraulic coupling is used at low speeds, and the coupling unit is cut out at higher speeds so that the engine is mechanically connected to the drive shaft.

In the other approach to the problem, where four forward speeds are provided, a conventional gear type transmission is provided for obtaining the usual three forward speeds. The fourth gear is brought into play, either automatically or by the operator, through a control separate from the usual gear lever, such as a contact incorporated in the accelerator pedal assembly. Actuation of the device, which is usually termed an overdrive, brings into play a gear reduction mechanism separate from the usual transmission which increases the ratio of drive shaft revolutions relative to engine revolutions. The overdrive mechanism is so designed that the fourth or overdrive speed should be used exclusively in the normal range of driving speeds. Therefore, the main function of the conventional transmission is to bring the car up to a speed at which the overdrive mechanism can be actuated, and the ordinary transmission is used a relatively small proportion of the actual driving time.

It is a major purpose of this invention to provide a system wherein the conventional transmission is eliminated and the car is brought up to the overdrive range without the use of a mechanical gear type transmission. This result is accomplished by reducing the number of cylinders fired per drive shaft revolution in the conventional intermediate gear range, and in still further reducing the number of cylinders fired when the vehicle is driven within the conventional high speed range. In the conventional low speed range and in the overdrive or driving range, the cylinders of the engine are fired in the usual manner.

It is an object of the invention to provide an improved power transmission mechanism for an internal combustion engine which permits elimination of the usual mechanical gear box.

It is a further object to provide a system wherein the numbers of explosions per drive shaft revolution is decreased in the conventional second and high speed ranges, either by interrupting the ignition current supplied to selected cylinders, or by disabling the intake valve of such selected cylinders.

It is a still further object to provide a distributor of novel construction for regulating the firing of the cylinders in accordance with the principles of my invention.

It is a still further object to provide such a mechanism which is reliable in operation, economical to manufacture, and which utilizes a minimum of moving parts.

Various other objects, advantages, and features of the invention will become apparent from the following detailed description taken in conjunction with the accompanying drawings, in which.

Figure 1:
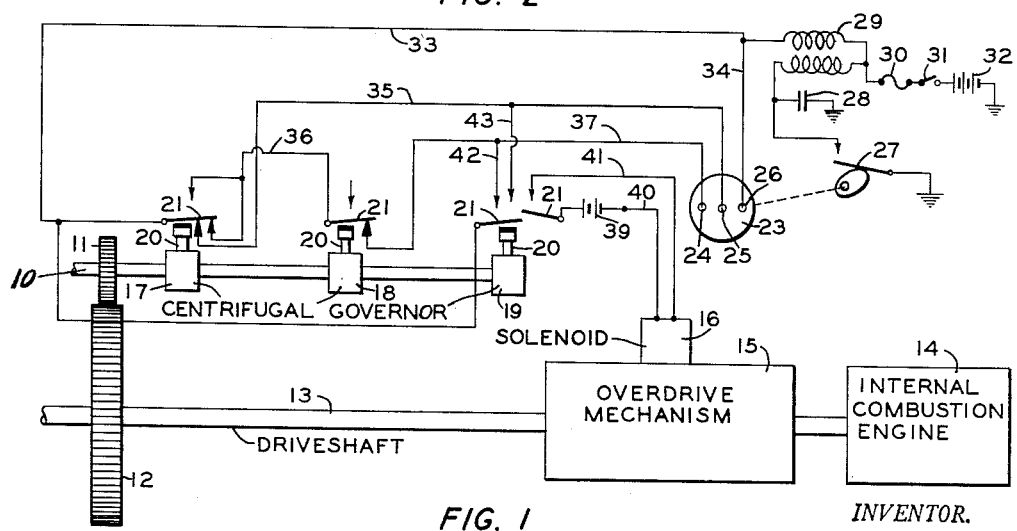
Figure 1 is a schematic circuit diagram illustrating the operation of the invention.

Referring now to the drawings, and particularly to Figure 1, a cam shaft 10 is coupled by gears 11, 12 to the drive shaft 13 of an internal combustion engine 14 provided with overdrive mechanism. Cam shaft 10, therefore, rotates at a speed proportional to that of the drive shaft 13.

Overdrive mechanism 15 can be of any conventional type. For purposes of explanation, mechanism 15 may include a planetary reducing gear comprising a sun gear, a ring gear, and a number of planet pinions supported by a planetary carrier. The planetary carrier may be coupled to the engine 14 and the ring gear may be coupled to the drive shaft 13. When the overdrive mechanism is not actuated, the sun gear is free to rotate and, consequently, there is no torque reduction in the overdrive mechanism. That is, the drive shaft is coupled directly to the engine crankshaft. The mechanism 15 is actuated by the solenoid 16 which is operatively associated with a pawl adapted for engagement with one of a plurality of slots in a drum attached to the sun gear. When the solenoid is actuated, the pawl enters one of the described slots with the result that rotation of the sun gear is prevented and the planetary gear assembly is operated to increase the number of drive shaft revolutions per engine revolution. The details of the overdrive mechanism are not illustrated nor described in detail, as they are well known to those skilled in the art. Reversing gears can either be incorporated in the overdrive system, or provided as a separate gear train.

Three centrifugal governors 17, 18, and 19 are actuated by the cam shaft 10, the three units being separately shown for purposes of explanation and clarity, it being understood, however, that they may all be incorporated in a single unit. As shown, the governor 17 has an arm 20 which moves a contact member 21 from a position engaging a lower pair of contacts to a position engaging a single upper contact. The governor 18 has an arm 20 which moves a contact member 21 out of engagement with a single lower contact and into engagement with a single upper contact. The governor 19 has a contact arm 20 which moves a pair of contact members 21, one member 21 engaging a pair of upper contacts and the other member 21 engaging a single upper contact when the arm is raised. In each instance, the described movement of contact arm 20 takes place when the governor exceeds the speed set for contact opening. Alternatively, each governor may close a set of contacts when the preset speed is exceeded, these contacts being connected in circuit with a current source and the winding of a relay provided with contacts in the manner shown by the figure.

The circuit of Figure 1 also includes a distributor 23 of novel construction having three contact terminals or conductors 24, 25 and 26, each controlling the firing of a selected number of spark plugs associated with the engine cylinders. Distributor 23 is associated, in the usual manner, with a breaker switch 27, a condenser 28, a magneto 29, a fuse 30, an ignition switch 31, and a battery 32 so that a pulse of high voltage ignition current is supplied to a conductor 33 by operation of breaker switch 27 and condenser 28 each time a contact arm of the distributor approaches a contact point therein.

The operation of the circuit of Figure 1 is as follows. The engine 14 is permanently geared to the drive shaft 13 so as to provide a ratio of drive shaft revolutions to engine revolutions suitable for use at the lowest driving speed, and in starting the vehicle from a stationary position. At such speeds, the contact member 21 of each governor unit is in its lower position and ignition pulses are transmitted successively to all the cylinders in the usual firing order. Thus, it will be noted that ignition current is supplied to the group of cylinders controlled by terminal 26 through a lead 34, to the group of cylinders controlled by terminal 25 through conductor 33 and a lead 35, and to the group of cylinders controlled by terminal 24 through conductor 33, and a lead 36, and a lead 37.

As the vehicle is accelerated and passes into the intermediate or "second gear" range, governor 17 is actuated and its contact member 21 is moved out of engagement with the lower contacts and into engagement with the upper contact. As a result, the ignition pulses passing through lead 35 to terminal 25 are interrupted, but terminal 24 continues to receive ignition pulses through leads 36 and 37. As a result, the number of cylinders fired per drive shaft revolution is decreased with resultant decrease in the power supplied by the engine. In the case of an eight cylinder engine, it is preferable to fire two-thirds of the usual number of cylinders during this period, the firing of the other one-third being interrupted. It should be pointed out that the firing of the same group of cylinders is not interrupted during the successive firing cycles. Rather, as will be explained later, all cylinders continue to fire although there are only two-thirds as many explosions per drive shaft revolution as when all cylinders are fired. This makes for smoother operation of the transmission system.

As the vehicle accelerates and reaches the conventional high speed range, centrifugal governor 18 is energized and its contact member 21 is moved out of engagement with the lower contact. As a result, terminals 24, 25 receive no ignition pulses although terminal 26 continues to receive them through lead 34. Thus, the number of cylinders fired per drive shaft revolution is still further decreased. In the case of an eight cylinder engine, it is preferable that only one-third of the usual number of cylinders be fired during the high speed portion of the acceleration cycle.

Acceleration of the vehicle continues in the high speed portion until a speed is reached at which the overdrive mechanism is actuated. This speed and higher speeds are referred to hereinafter as the driving range. Actuation of the overdrive mechanism is brought about by energization of centrifugal governor 19 which moves its associated contact members 21 into engagement with the upper contacts. As a result, solenoid 16 is operated through a circuit which includes a battery or other current source 39 together with leads 40, 41. As a result, the overdrive gear train is brought into play and the number of drive shaft revolutions per engine revolution is substantially increased. Further responsive to the described operation of governor 19, current is supplied to terminal 24 through a lead 42 and the lead 37, and to terminal 25 through a lead 43 and the lead 35. As a result, all cylinders of the engine are successively fired in their normal firing order. When the vehicle is decelerated, a reverse sequence of operation occurs, the centrifugal governors 19, 18, 17 being successively deenergized as the vehicle speed decreases through the various transmission ranges.

It will be apparent that I have attained a major object of the invention in eliminating the conventional mechanical gear trains which are shiftable to provide various ratios of engine speed and drive shaft speed. Although Figure 1 has been described with respect to a vehicle having four forward speeds, it will be evident that the principles of the invention are applicable to vehicles having three, five, or even more speeds, such as buses and trucks. Broadly, the invention resides in a two speed transmission wherein less than the normal number of cylinders is fired throughout a portion of the low speed range of such transmission.

Figure 2:
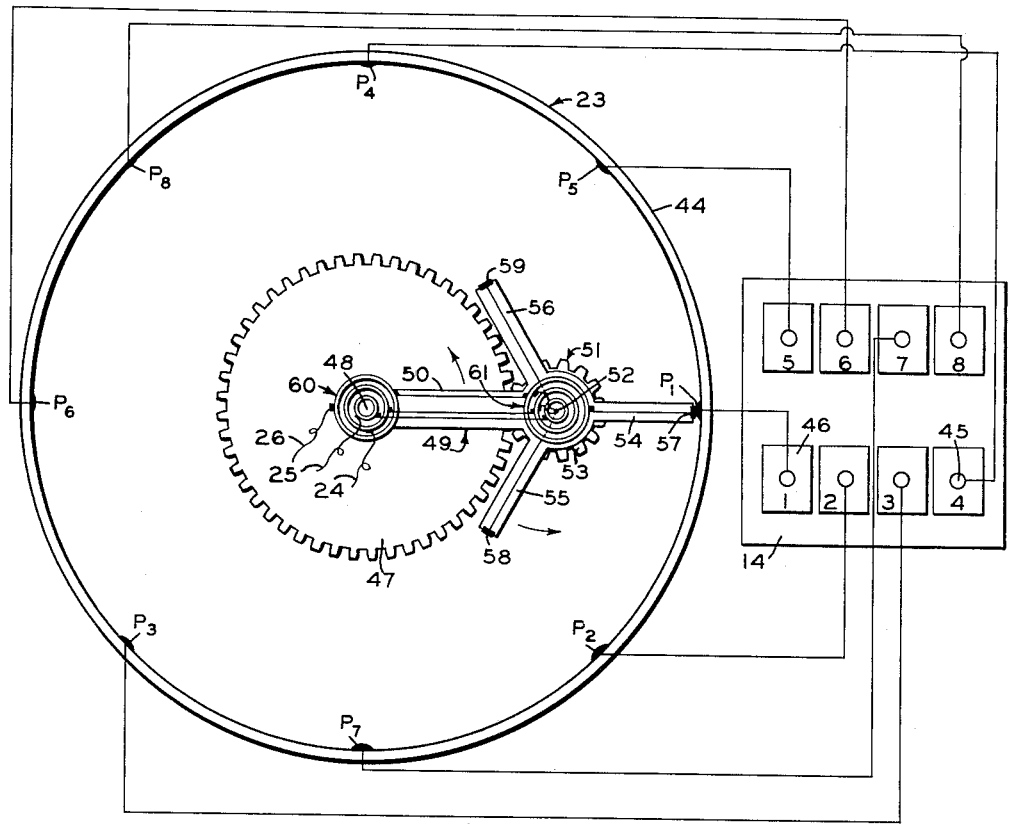
Figure 2 is a schematic circuit diagram of the distributor and parts associated therewith.

In Figure 2, I have shown the novel structure of the distributor 23 which regulates the firing of the cylinders in the manner hereinafter described. This unit includes a casing 44 of cylindrical configuration, this casing having a series P1 to P8 of contact points spaced at equal intervals therearound, these contact points being numbered in accordance with the usual firing order of an eight cylinder engine, and each contact point being connected to a spark plug 45 for supplying ignition current to a cylinder 46 of the engine 14. A spur gear 47 is fixed at the center of casing 44 and a rotatable shaft 48 positioned axially of the casing carries a rotatable assembly 49 which is driven in a counter clockwise direction, Figure 2, by the shaft. This assembly includes an arm 50 fixed to shaft 48 which, in turn, carries an assembly 51 rotatable about a shaft 52 journaled at the outer end of arm 50. Assembly 51 also carries a pinion 53 which is fixed to shaft 52 and meshes with spur gear 47. Accordingly, as the assembly 49 is rotated, assembly 51 is also rotated in a counterclockwise direction about the shaft 52. Assembly 51 further comprises three radial arms 54, 55 and 56 which are spaced at equal angular distances, the arms carrying at their ends the respective contacts 57, 58 and 59. The distributor further includes two slip ring assemblies 60, 61 which carry current from the distributor casing to the contacts 57, 58, 59. In this manner, terminal 24 is connected to contact 58, terminal 25 is connected to contact 59 and terminal 26 is connected to contact 57.

In operation, shaft 48 is rotated at a speed proportional to the engine speed, the contacts 57, 58 and 59 successively passing adjacent contact points P due to the rotation of pinion 53 about spur gear 47 and its axis with one of the contacts 57, 58 or 59 adjoining a contact point P each time an ignition pulse is produced by the circuit of Figure 1. Accordingly, current passes from contact 57 successively to points P1, P8, P7, P5, etc., while current passes from contact 58 successively to contacts P5, P6, P2, P4, etc. It will be evident that each contact arm 54, 55 and 56 controls one-third of the cylinder firings, that one-third of the cylinder firings are interrupted when no current is supplied to one of the leads 24, 25 or 26, and that two-thirds of the firings are interrupted when no current is supplied to two of the terminals 24, 25 or 26. However, provided the number of cylinders in the engine is not divisible by three, the current to different cylinders is interrupted during each cycle.

The manner in which the cylinders are fired is illustrated in the following table in which the numerals represent the identifying numbers of the cylinders being fired and zero represents a cylinder to which the ignition current is interrupted as a result of the operation of the circuit of Figure 1.

| | | | | |
|---|---|---|---|---|
| Low speed range | 1 5 4 8 6 3 7 2 | 1 5 4 8 6 3 7 2 | 1 5 4 8 6 3 7 2 | Full power |
| Intermediate speed range | 1 5 0 8 6 0 7 2 | 0 5 4 0 6 3 0 2 | 1 0 4 8 0 3 7 0 | ¾ power |
| High speed range | 1 0 0 8 0 0 7 0 | 0 5 0 0 6 0 0 2 | 0 0 4 0 0 3 0 0 | ½ power |
| Driving range | 1 5 4 8 6 3 7 2 | 1 5 4 8 6 3 7 2 | 1 5 4 8 6 3 7 2 | Full power |

Where the supply of ignition current is interrupted, as described in connection with Figures 1 and 2, some fuel is wasted since the intake valves to the non-operative cylinders are not disabled so that fuel is injected into the cylinders, although it is not burned. It is specifically within the scope of this invention to control the air intake valves, compression or any other variable to prevent the firing of the selected groups of cylinders either in accordance with the distribution principle explained in connection with Figure 2, or by disabling one or two groups of valves permanently during the intermediate and high speed ranges.

Figure 3:
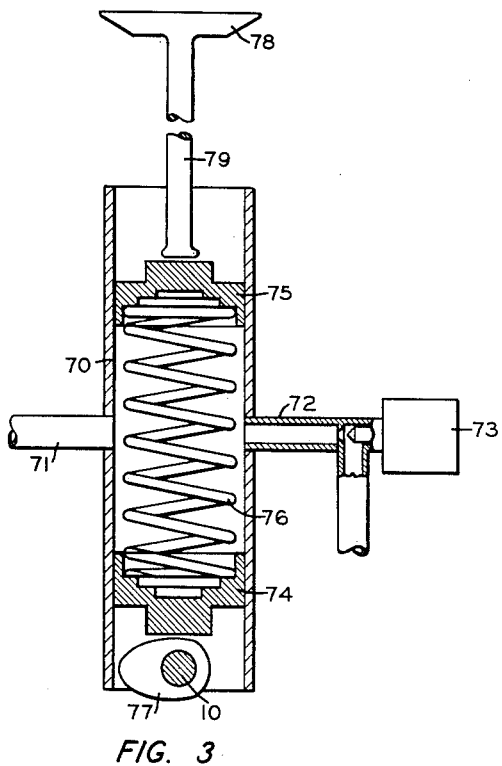
Figure 3 is a vertical sectional view, partially in elevation, of an intake valve.

In Figure 3, I have shown a manner in which the intake valve of a selected cylinder can be disabled. The valve structure includes a barrel 70 to which oil or other hydraulic fluid under pressure may be admitted by a line 71 and discharged by a line 72 under the control of a solenoid valve 73. A pair of piston members 74, 75 are mounted for reciprocation within the barrel 70, these members being separated by a spring 76. Member 74 is reciprocated by a cam 77 fixed to the cam shaft 10 while member 75 is provided with a valve head 78 carried by a rod 79. When solenoid valve 73 is closed, the barrel 70 between members 74, 75 is filled with hydraulic fluid under pressure. The oil being substantially incompressible, the reciprocating movements of member 74 are followed by similar reciprocating movements of member 75 so that valve head 78 is opened and closed at the proper times during each cycle. When the valve 73 is opened, the fluid within barrel 70 is free to pass outwardly through line 72 so that no oil pressure is built up within the barrel 70. As a result, member 75 does not follow the movements of member 74 so that the fuel valve remains closed and no fuel is admitted to the cylinder.

In the case of an eight cylinder engine, three of the valves may be under the control of governor 17, Figure 1, and two additional valves may be under the control of governor 18 so that three valves are disabled while the engine is in the intermediate range and two additional valves are disabled as the vehicle passes into the high speed range. Alternatively, the valves 73 can be controlled by a distributor mechanism of the type shown in Figure 2 so that the same valves are not disabled during the entire time the vehicle is traveling within the intermediate and high speed ranges.

Figure 4:
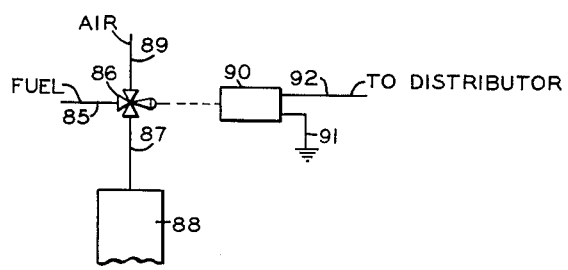
Figure 4 is a view of a solenoid valve associated with a cylinder.

For example, as shown in Figure 4, the fuel conduit 85 for each cylinder can lead through a three-way solenoid valve 86 to a line 87 and supply fuel to a cylinder 88. Air is supplied to the three-way solenoid valve 86 through a line 89. The operating winding 90 of valve 86 has a lead grounded at 91 and another lead 92 connected to one of the points P of the distributor 23. Thus, during the low, intermediate and high speed ranges, the fuel supply to the appropriate cylinders is operated in the same manner as described in connection with the engine spark plugs in the system of Figure 2. When the cylinder is disabled, valve 86 is in position to close conduit 85 to permit air to pass through conduit 89 and line 87 to the cylinder. When the appropriate distributor contact is made, solenoid winding 90 is energized with the result that three-way valve connects conduit 85 to line 87 and disconnects conduit 89 therefrom, thereby permitting fuel to flow to the cylinder. It will be understood that the supply of ignition current to the cylinder spark plugs can be interrupted at the same time, if desired, although this is not essential. It will be understood that each cylinder of the engine has a solenoid valve associated therewith which is actuated by one of the contacts P of Figure 2, and that each solenoid valve is provided with fuel and air connections in the manner described.

It will be evident that the system just described provides a pattern of explosions per mile which is the same as that provided by a regular gear transmission. Further, the cylinders which are fired by the system of Figure 4 all have power loads comparable to those cylinders firing in a car equipped with a conventional gear transmission. That is, the number of cylinders in use is adjusted to maintain a constant optimum connecting-rod loading for such cylinders. Finally, important advantages in fuel economy are obtained, since the disabled cylinders are not supplied with fuel.

While the invention has been described in connection with a present, preferred embodiment thereof, it is to be understood that this description is illustrative only and is not intended to limit the invention.

I claim:

1. A variable transmission device for coupling a drive shaft to an internal combustion engine having a plurality of cylinders, said device normally providing a preselected ratio between engine speed and drive shaft speed, and incorporating overdrive mechanism actuatable to decrease the ratio between engine speed and drive shaft speed, a speed responsive regulator for preventing the firing of certain cylinders of said engine, and means for overriding said regulator to permit firing of all of said cylinders when the overdrive mechanism is actuated.

2. A variable transmission device for coupling a drive shaft to an internal combustion engine having a plurality of cylinders, said device normally providing a preselected ratio between engine speed and drive shaft speed, and incorporating overdrive mechanism actuatable to decrease the ratio between engine speed and drive shaft speed, a speed responsive regulator to provide firing of all cylinders in a low range of drive shaft speed, and to prevent the firing of certain cylinders in an intermediate speed range, and means for overriding said regulator to permit firing of all of said cylinders when the overdrive mechanism is actuated.

3. A variable transmission device for coupling a drive shaft to an internal combustion engine having a plurality of cylinders, said device normally providing a preselected ratio between engine speed and drive shaft speed, and incorporating overdrive mechanism actuatable to decrease the ratio between engine speed and drive shaft speed, a speed responsive regulator to provide firing of all cylinders in a low range of drive shaft speed, to decrease the number of cylinders fired per drive shaft revolution in an intermediate range, and to further decrease the number of cylinders fired per drive shaft revolution in a high range, and means for overriding said regulator to permit firing of all of said cylinders when the overdrive mechanism is actuated.

4. In a vehicle having an internal combustion engine, a drive shaft, a variable transmission device coupling said drive shaft to said engine, said device being actuable to provide a high ratio and a low ratio of engine speed to drive shaft speed, means for sensing drive shaft speed, a regulator responsive to said sensing means and controlling the firing of said cylinders, said regulator preventing the firing of certain cylinders when the drive shaft speed is above a selected value, and means for overriding said regulator to permit all of said cylinders to fire when said variable transmission device is actuated to provide a low ratio of engine speed to drive shaft speed.

5. In a vehicle having an internal combustion engine with a plurality of cylinders, a drive shaft driven by said engine, and a variable transmission device coupling said drive shaft to said engine, said device being actuable to provide a high ratio and a low ratio of engine speed to drive shaft speed, means for sensing a drive shaft speed representing a transition from a low to an intermediate range, means responsive to said sensing means to cause intermittent firing of said cylinders thereby to reduce the number of cylinders fired per drive shaft revolution, and means for overriding said last-mentioned means to permit all of said cylinders to fire when said variable transmission device is actuated to provide a low ratio of engine speed to drive shaft speed.

6. In a vehicle having an internal combustion engine with a plurality of cylinders, a drive shaft driven by said engine, and a variable transmission device coupling said drive shaft to said engine, said device being actuable to provide a high ratio and a low ratio of engine speed to drive shaft speed, means for sensing a drive shaft speed representing a transition from a low to an intermediate range, means for sensing a drive shaft speed representing a transition from said intermediate range to a high range, means responsive to said first sensing means to cause intermittent firing of said cylinders thereby to reduce the number of cylinders fired per drive shaft revolution, means responsive to said second sensing means to cause intermittent firing of said cylinders, and thereby to further reduce the number of cylinders fired per drive shaft revolution, and means for overriding said last-mentioned means to permit all of said cylinders to fire when said variable transmission device is actuated to provide a low ratio of engine speed to drive shaft speed.

7. A variable transmission device for coupling a drive shaft to an internal combustion engine having a plurality of cylinders, said device normally providing a preselected ratio between engine speed and drive shaft speed, and incorporating overdrive mechanism actuatable to decrease the ratio between engine speed and drive shaft speed, a speed-responsive governor mechanism for preventing the firing of certain cylinders of said engine when the drive shaft speed is within an intermediate or high range, the number of cylinders thereby being prevented from firing being greater in the high range than in the intermediate range, and means for overriding said governor to permit firing of all of said cylinders when the overdrive mechanism is actuated.

8. A vehicle adapted for operation at low, intermediate, high and driving speeds, said driving speed being faster than said high speed, said vehicle having a drive shaft, an internal combustion engine with a plurality of cylinders, means for establishing a constant ratio between engine speed and drive shaft speed for operation in the low, intermediate and high speed ranges, means for establishing a lower ratio between engine speed and drive shaft speed in the driving range, means for firing all of said cylinders in regular order in the low speed and driving ranges, and means for firing said cylinders intermittently with respect to the regular order in the intermediate and high speed ranges, the number of cylinders fired per drive shaft revolutions in the intermediate speed range being greater than in the high speed range.

9. A vehicle adapted for operation at low speed, at least one intermediate speed, and a driving speed, said driving speed being faster than any intermediate speed, said vehicle having a drive shaft, an internal combustion engine with a plurality of cylinders, means for establishing a constant ratio between engine speed and drive shaft speed for operation in the low and intermediate speed ranges, means for establishing a lower ratio between engine speed and drive shaft speed in the driving range, means for firing all of said cylinders in regular order in the low speed and driving ranges, and means for firing said cylinders intermittently with respect to said regular order in the intermediate range.

10. In a vehicle having an internal combustion engine with a plurality of cylinders, a spark plug for firing each cylinder, a source of ignition current, and a drive shaft driven by said engine, speed-responsive governor mechanism, and contact means actuated by said governor mechanism to successively connect all of said spark plugs to said current source while the drive shaft speed is in a low range, and for intermittently connecting said spark plugs to said current source when the drive shaft speed is within a high range, whereby the number of cylinders fired per drive shaft revolution is greater in the low range than in the high range.

11. In a vehicle having an internal combustion engine with a plurality of cylinders, a spark plug for firing each cylinder, a source of ignition current, and a drive shaft driven by said engine, speed-responsive governor mechanism, and contact means actuated by said governor mechanism to successively fire all of said cylinders when the drive shaft speed is within a low range, and to intermittently fire said cylinders when the drive shaft speed is within an intermediate or high range, the number of cylinders fired per drive shaft revolution being greater in the intermediate range than in the high range.

12. In a vehicle having an internal combustion engine with a plurality of cylinders, a spark plug for firing each cylinder, a source of ignition current, and a drive shaft driven by said engine, speed-responsive governor mechanism, and contact means actuated by said governor mechanism to successively connect all of said spark plugs to said current source while the drive shaft speed is in a low range and a driving range, and for intermittently connecting said spark plugs to said current source when the drive shaft speed is within a range intermediate said low and driving ranges, whereby the number of cylinders fired per drive shaft revolution is less in the intermediate range than in the low range or driving range.

13. In a vehicle having an internal combustion engine with a plurality of cylinders, a spark plug for firing each cylinder, a source of ignition current, and a drive shaft driven by said engine, speed-responsive governor mechanism, and contact means actuated by said governor mechanism to successively fire all of said cylinders when the drive shaft speed is within a low range or a driving range, and to intermittently fire said cylinders when the drive shaft speed is within an intermediate or high range, the speed in said driving range being greater than the speed in said high range, and the number of cylinders fired per drive shaft revolution being greater in the intermediate range than in the high range.

14. In a vehicle having an internal combustion engine with a plurality of cylinders, a spark plug for firing each cylinder, a source of ignition current, and a drive shaft driven by said engine, speed-responsive governor mechanism, a distributor having separate circuits, each circuit being adapted to successively connect a group of said spark plugs to said current source, contact means controlled by said governor mechanism to energize all of said circuits while the drive shaft speed is in a low range, and for energizing at least one selected circuit when the drive shaft speed is within a high range, whereby the number of cylinders fired per drive shaft revolution is greater in the low range than in the high range.

15. In a vehicle having an internal combustion engine with a plurality of cylinders, a spark plug for firing each cylinder, a source of ignition current, and a drive shaft driven by said engine, there being a preselected ratio between engine speed and drive shaft speed, speed-responsive governor mechanism, a distributor having separate circuits, each circuit being adapted to successively connect a group of said spark plugs to said current source, contact means controlled by said governor mechanism to energize all of said circuits while the drive shaft speed is in a low range, and for energizing at least one selected circuit when the drive shaft speed is within a high range, whereby the number of cylinders fired per drive shaft revolution is greater in the low range than in the high range, overdrive mechanism actuatable to decrease the ratio between engine speed and drive shaft speed, and contact means to energize all of said separate distributor circuits when said overdrive mechanism is actuated.

16. In a vehicle having an internal combustion engine with a plurality of cylinders, a spark plug for firing each cylinder, a source of ignition current, and a drive shaft driven by said engine, speed-responsive governor mechanism, a distributor having separate circuits, each circuit being adapted to successively connect a group of said spark plugs to said current source, contact means controlled by said governor mechanism to energize all of said circuits while the drive shaft speed is in a low range, for energizing a plurality of selected circuits when the drive shaft speed is within an intermediate range, and for energizing one selected circuit when the drive shaft speed is within a high range, whereby the number of cylinders fired per drive shaft revolution is greater in the intermediate range than in the high range, and greater in the low range than in the intermediate range.

17. In a vehicle having an internal combustion engine with a plurality of cylinders, a spark plug for firing each cylinder, a source of ignition current, and a drive shaft driven by said engine, there being a preselected ratio between engine speed and drive shaft speed, speed-responsive governor mechanism, a distributor having separate circuits, each circuit being adapted to successively connect a group of spark plugs to said current source, contact means controlled by said governor mechanism to energize all of said circuits while the drive shaft speed is in a low range, for energizing a plurality of selected circuits when the drive shaft speed is within an intermediate range, and for energizing one selected circuit when the drive shaft speed is within a high range, whereby the number of cylinders fired per drive shaft revolution is greater in the intermediate range than in the high range, and greater in the low range than in the intermediate range, overdrive mechanism actuatable to decrease the ratio between engine speed and drive shaft speed, and contact means to energize all of said separate distributor circuits when the overdrive mechanism is actuated.

18. A distributor comprising, in combination, a generally cylindrical casing, a series of contact points arranged symmetrically about said casing, a rotatable shaft positioned axially within said casing, a stationary external ring gear fixed at the center of said casing, a rotatable assembly driven by said shaft and including a pinion meshing with said gear, a plurality of contact arms connected to and rotatable with said pinion, said contact arms having contacts at the respective ends thereof which successively pass adjacent adjoining contact points as the assembly is rotated, slip rings associated with said pinion to connect said contacts electrically with conductors on said rotatable assembly, and additional slip rings on said rotatable assembly connecting said conductors with stationary conductors.

19. Apparatus in accordance with claim 1 in which each cylinder has an intake valve including a valve head, a driving member for said valve head, means for maintaining a body of hydraulic fluid under pressure between said valve head and said actuating member to permit said valve to be actuated thereby, a device for releasing said pressure to disable said valve, and means connecting the releasing devices of said valves to said regulator for preventing the firing of certain cylinders of said engine.

20. Apparatus in accordance with claim 1 wherein each cylinder has a line for supplying fuel thereto, a solenoid valve in said line which is open when current is supplied to the solenoid winding, a source of current, and means for connecting said source of current and the solenoid windings of said certain valves to said speed responsive regulator for preventing the firing of certain cylinders of said engine.

References Cited in the file of this patent

UNITED STATES PATENTS

| | | |
|---|---|---|
| 637,298 | Strong | Nov. 21, 1899 |
| 971,334 | Whalen | Sept. 27, 1910 |
| 1,479,498 | Dement | Jan. 1, 1924 |
| 1,990,808 | Werder | Feb. 12, 1935 |
| 2,146,230 | Rightmyer | Feb. 7, 1939 |
| 2,186,043 | Rohlin | Jan. 9, 1940 |
| 2,198,247 | Grob | Apr. 23, 1940 |
| 2,250,814 | Rohlin | July 29, 1941 |
| 2,427,583 | Mertens | Sept. 16, 1947 |
| 2,694,387 | Winkler | Nov. 16, 1954 |